United States Patent [19]

Batchelor

[11] Patent Number: 5,724,103
[45] Date of Patent: Mar. 3, 1998

[54] CD ROM INFORMATION REFERENCES DELIVERED TO A PERSONAL COMPUTER USING THE VERTICAL BLANKING INTERVALS ASSOCIATED DATA TECHNOLOGY FROM A NABTS COMPLIANT TELEVISION BROADCAST PROGRAM

[75] Inventor: Steve Batchelor, Hillsboro, Oreg.

[73] Assignee: Intel Corporation, Santa Clara, Calif.

[21] Appl. No.: 558,030

[22] Filed: Nov. 13, 1995

[51] Int. Cl.$^6$ ............................................. H04N 5/44
[52] U.S. Cl. ................... 348/553; 348/460; 348/564
[58] Field of Search .............................. 348/552, 553, 348/563, 564, 468, 465, 473, 476, 478, 460

[56] References Cited

U.S. PATENT DOCUMENTS 4,894,789  1/1990  Yee ............................... 348/468
5,262,860  11/1993  Fitzpatrick et al. ............ 348/468
5,537,151  7/1996  Orr et al. ....................... 348/564
5,561,457  10/1996  Cragun et al. ................. 348/553

*Primary Examiner*—Victor R. Kostak
*Attorney, Agent, or Firm*—Blakely, Sokoloff, Taylor & Zafman

[57] ABSTRACT

A system that displays text and graphic information with vertical blanking interval of a publicly broadcasted video signal. The system also includes a personal computer that has a VBI decoder which can separate the data from the video signal. The separated data contains command and address information, which instruct the personal computer to retrieve text/graphic information from a storage device, and display the retrieved text/graphic information on a computer monitor. The personal computer also contains a NTSC decoder which can decode the video signal and display a television image on the computer monitor. The broadcaster inserts data that retrieves text and graphic information which correspond to the television image displayed by the computer monitor. The retrieved text and graphic information may be stored for later viewing by the user.

20 Claims, 3 Drawing Sheets

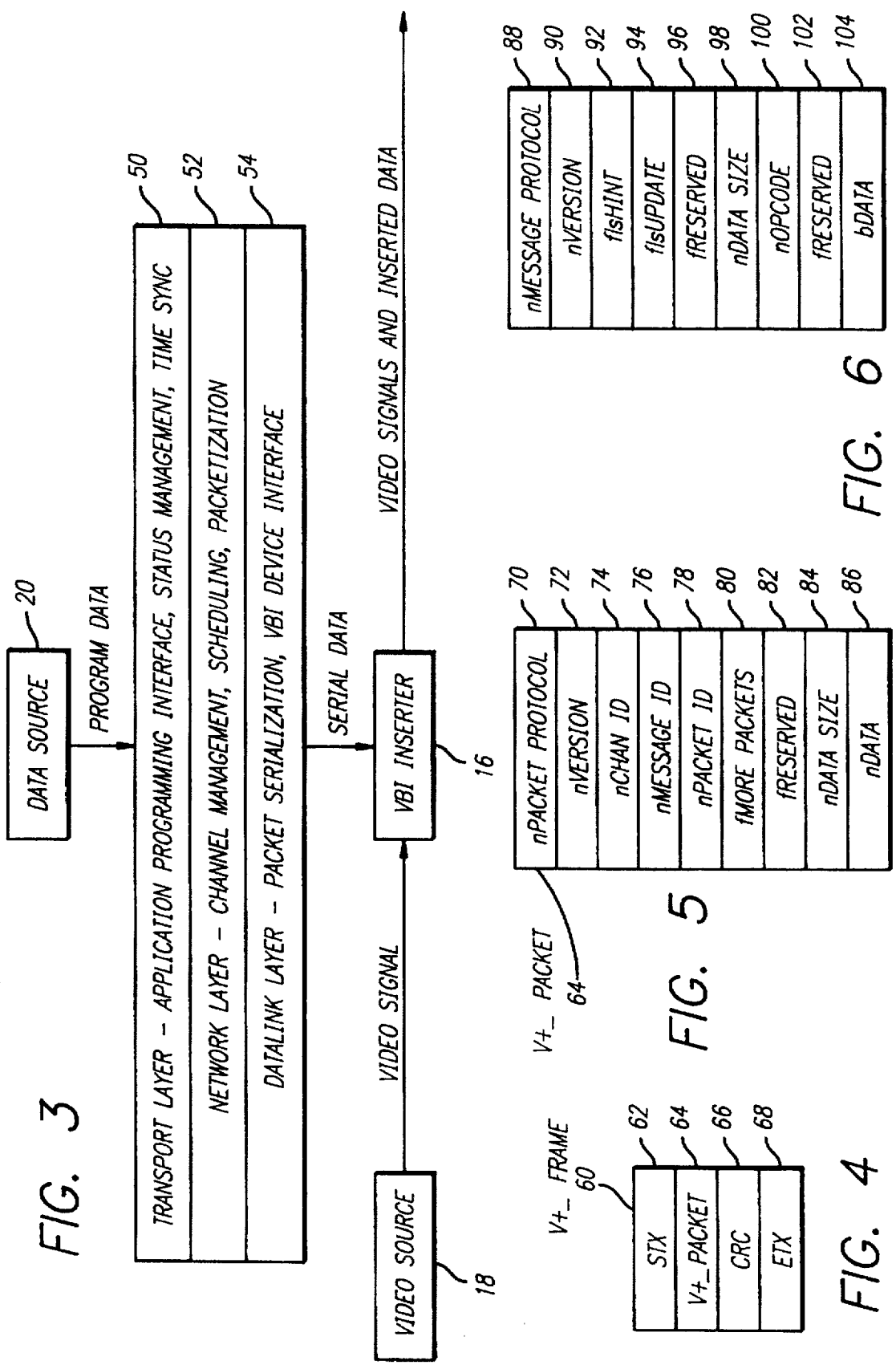

CD ROM INFORMATION REFERENCES DELIVERED TO A PERSONAL COMPUTER USING THE VERTICAL BLANKING INTERVALS ASSOCIATED DATA TECHNOLOGY FROM A NABTS COMPLIANT TELEVISION BROADCAST PROGRAM

BACKGROUND OF THE INVENTION

1. FIELD OF THE INVENTION

The present invention relates to a method and apparatus for inserting database address information into the vertical blanking interval of a video signal that is received by a personal computer

2. DESCRIPTION OF RELATED ART

Some computer systems contain NTSC decoders which allow publicly broadcasted video to be displayed on the monitor of the computer. The video may be displayed in a separate window that allows the user to view the video images while performing other operations on the system.

Personal computers can also be provided with text oriented databases that can be retrieved and viewed by the user. By way of example, there is a program marketed under the trademark INTERACTIVE ENCYCLOPEDIA by COMPTON of San Diego, Calif. which provides an interactive encyclopedia. The COMPTON product allows the user to select and review text and graphics which correspond to various historical events, geographical locations, etc.

It would be desirable to provide a system that would retrieve and display text/graphic data which corresponds to a television image displayed on a computer monitor. For example, if a user is watching an informational program on elephants, it would be desirable if various facts and graphics on elephants were presented on the screen along with the television image. It would also be desirable if the relevant facts/graphics were stored in memory for later viewing by the user.

SUMMARY OF THE INVENTION

The present invention is a system that displays text and graphic information with broadcasted television video. The broadcast system includes a vertical blanking interval (VBI) inserter which inserts data into the vertical blanking interval of a broadcasted video signal. The receiving system includes a personal computer that contains a VBI decoder which can separate the data from the video signal. The separated data contains command and address information, which instruct the personal computer to retrieve text/graphic information from a storage device, and display the retrieved text/graphic information on a monitor. The personal computer also contains a NTSC decoder which can decode the video signal and display a television image on the monitor. The broadcaster inserts data that retrieves text and graphic information which correspond to the television image displayed by the monitor. The retrieved text and graphic information may be stored for later viewing by the user.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3 is a schematic showing the layers of a video encoder;

FIG. 4 is a schematic showing the formatting of a video frame that is inserted into the video blanking interval of a video signal;

FIG. 5 is a schematic showing the formatting of a video packet;

FIG. 6 is a schematic showing the formatting of a message provided to the encoder.

DETAILED DESCRIPTION OF THE INVENTION

Figure 1:
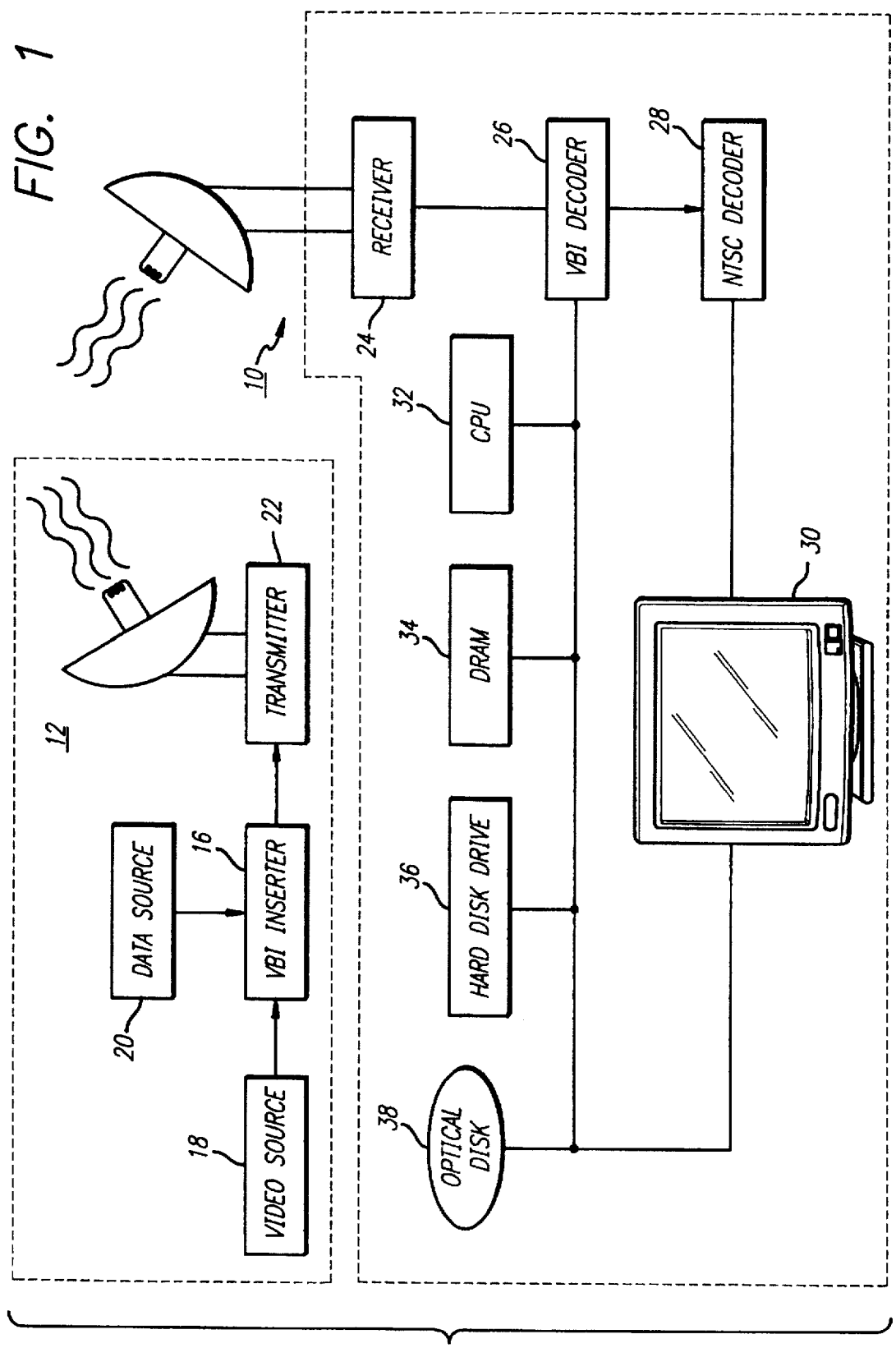
FIG. 1 is a schematic of the system of the present invention.

Referring to the drawings more particularly by reference numbers, FIG. 1 shows a system of the present invention. The system includes a personal computer 10 that receives video signals and other information from a broadcaster 12. The broadcaster 12 may be any broadcasting system including satellite and cable networks. The broadcaster 12 includes a vertical blanking interval (VBI) inserter 16 that has one input connected to a video source 18 and another input connected to a data source 20. The video source 18 generates video signals that have a vertical blanking interval. The VBI inserter 16 inserts data generated by source 20 into the vertical blanking interval of the video signal. The VBI inserter 16 can be a unit sold by Norpak Corp. of Ottawa, Ontario, Canada under model number TDS-3. The video signal and accompanying inserted data are transmitted by a transmitter 22.

The video signal and inserted data are received by a receiver 24. The receiver 24 provides the signal and data to a vertical blanking interval (VBI) decoder 26. The VBI decoder 26 which separates the data from the video signal. The video signal is provided to a NTSC decoder 28. The decoder 28 converts the video signal into television signals that can be displayed on a computer monitor 30.

The computer 10 typically contains a central processing unit (CPU) 32, a dynamic random access memory (DRAM) device 34, a massive storage device such as a hard disk drive 36, and an optical disk drive 38. The optical disk drive 38 may contain an optical disk which contains a text and graphic based database. By way of example, the optical disk may be a "CD-ROM" product sold by COMPTON software under the trademark INTERACTIVE ENCYCLOPEDIA. The COMPTON ENCYCLOPEDIA contains text and graphic information which relate to historical events, geographical locations, etc, typically found in an encyclopedia. The text and graphic information is located within addressable memory locations of the optical disk.

The CPU 32 receives the data separated from the video signal by the VBI decoder 26. The data typically contains command and address information that instruct the CPU 32 to retrieve specific text and graphic information from the optical disk 38 and display the information on the computer monitor 30.

Figure 2:
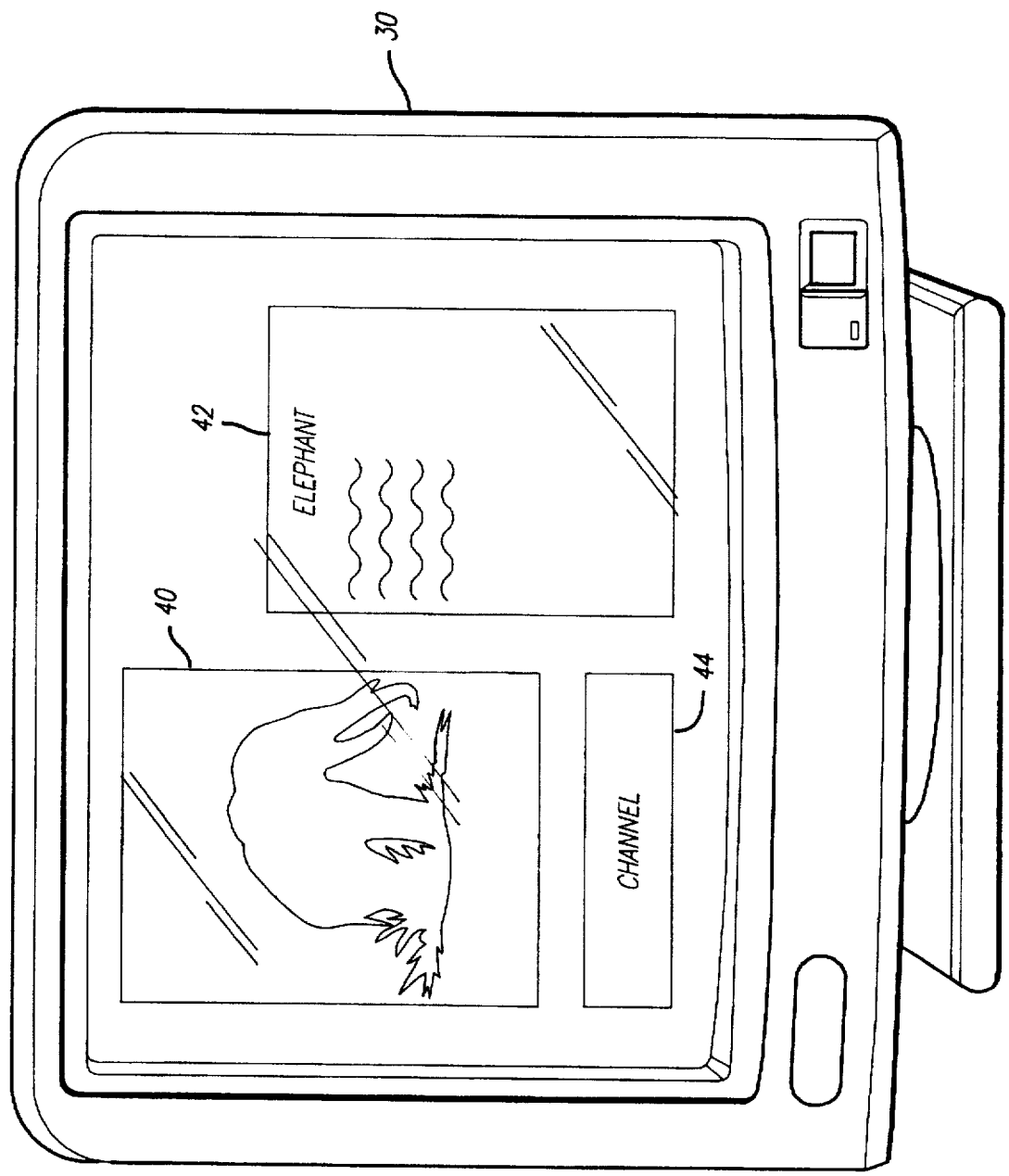
FIG. 2 is a screen of a video monitor.

FIG. 2 shows a screen of the computer monitor 30. The screen may include a window 40 that displays the television image and a separate window 42 that shows the text and graphic information retrieved from the optical disk 38. The text/graphic information typically relates to the video image shown in window 40. For example, the video window 40 may display an elephant. The text/graphic window 42 may display particular facts regarding elephants. The monitor 30 may have a graphical user interface for input commands 44 that allows the user to change television channels. The new channel may also contain VBI inserted data which retrieves and displays text/graphic information that relates to the television images shown on the new channel.

The personal computer may have a resident program which stores the text/graphic information retrieved from the optical disk 38 onto the magnetic disk drive 36. Additionally, the program may have a configuration window which allows the user to select whether the text/graphic information is to be saved. The text/graphic information may be saved in a file that can be recalled and viewed by the user. The video signal may be converted to a binary format for storage with the text/graphic information so that the user can view the text and video in combination. Alternatively, the video signal may be stored on a video cassette recorder (not shown).

As shown in FIG. 3, the format of the inserter 16 may have different application layers, including a transport layer 50, a network layer 52 and a datalink layer 54 which convert the program data from the data source into a serial data stream that can be inserted into the vertical blanking interval of the video signal by the VBI inserter 16. The transport layer 50 provides an interface with the data source. The data source 20 may be a personal computer which is programmed to send commands, addresses etc, at predetermined time intervals. For example, the video signal may be transmitting images of an elephant between 0-5 minutes and a tiger between 5-10 minutes. The data source 20 can generate command/address data to retrieve "elephant" text/graphic data at 0 minutes and then generate command/address data to retrieve "tiger" text/graphic data at 5 minutes, and so forth and so on.

The network layer 52 packetizes the data. The datalink layer 54 serializes the packeted data for serial transmission to the VBI inserter 16. In the preferred embodiment, the associated data is provided to the VBI inserter in a Vt_Frame 60 shown in FIG. 4. The Vt_Frame 60 includes a start frame field STX 62, a data packet field Vt_Packet 64, a check field CRC 66 and an end of frame character ETX 68.

In the preferred embodiment, the Vt_Packet 64 is formatted as shown in FIG. 5. The nPacketProtocal field 70 is a byte-length field which identifies the packet as one supported by the protocol. The nVersion field 72 specifies the type of inserter that is transmitting the packet. The nChanID field 74 is an integer value which provides the channel number of the packet in the serialized bitstream. The nMessageID field 76 specifies the message number of the channel on which the packet is transmitted. The nPacketID field 78 defines the number of packets in a particular message. The fMorePackets field 80 specifies whether there are any more packets in the message. The fReserved field 82 is reserved for further use. The length of the data is specified in the nDataSize field 84. The nData field 86 contains the data.

In the preferred embodiment, the data is typically provided to the inserter 16 by the data source in the format shown in FIG. 6. The nMessageProtocal field 88 is a byte length field which identifies the type of transmission being provided. The nVersion field 90 identifies the version of the protocol. The fIsHint field 92 indicates that the data is to precede an event such as a television program. The fIsUPdate field 94 indicates whether the information is updating transmitted information. The fReserved field 96 is unused and reserved for later use. The field nDataSize 98 specifies the number of bytes in the data field. The nOpcode field 100 define a particular operation to be performed with the data. For example, the operation may be a read memory command and a display command. The fReserved2 field 102 is not used and the bData field 104 contains the data. The data may contain the specific addresses to be retrieved from the storage device 38. The addresses requested typically correspond to the physical address locations of the desired data on the optical disk. Alternatively, a common address may be employed with a specific optical disk identification (ID). The broadcaster may transmit the specific optical disk ID and the address data. The computer may have a look-up table which allows the CPU to map the requested address information to the physical addresses of the requested optical disk.

In operation, the data source 20 provides program data that is inserted into the vertical blanking interval of a video signal by the VBI inserter 16. The video signal and data are transmitted to the VBI decoder 26 which separates the data from the video signal. The video signal is converted to a television image that is displayed by a computer monitor 30. The separated data is provided to the CPU 32 which generates commands that retrieve data from the optical disk 38 in accordance with address information provided with the data. The retrieved data is displayed with the television image on the monitor 30. The CPU 32 can also command a storage of the retrieved data from the optical disk 38 to the magnetic disk 36 for later retrieval.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system that receives a video signal and a data signal from a broadcaster which inserts the data signal into a vertical blanking interval of the video signal and transmits both the video and data comprising:

a video receiver that receives the video and data signals;

a vertical blanking interval decoder that separates the data signal from the video signal;

a video decoder that converts the video signal into a television signal;

a monitor that displays the television signal;

a non-volatile storage device that contains a text/graphic signal that is resident within said non-volatiles storage device; and, a central processing unit which receives the data signal from said vertical blanking interval decoder and generates a command to transfer said text/graphic signal from said non-volatile storage device to said monitor to display said text/graphic signal on said monitor.

2. The system as recited in claim 1, wherein said non-volatile storage device is an optical disk drive.

3. The system as recited in claim 1, wherein the data signal includes a memory address.

4. The system as recited in claim 1, wherein said central processing unit commands a storage of said text/graphic signal into a file of said non-volatile storage device.

5. A system, comprising:

a broadcaster that transmits a video signal and a data signal that is inserted into a vertical blanking interval of the video signal;

a video receiver that receives the video and data signals;

a vertical blanking interval decoder that separates the data signal from the video signal;

a video decoder that converts the video signal into a television signal;

a monitor that displays the television signal;

a non-volatile storage device that contains a text/graphic signal that is resident within said non-volatile storage device; and, a central processing unit which receives the data signal from said vertical blanking interval decoder and generates a command to transfer said text/graphic signal from said non-volatile storage device to said monitor to display said text/graphic signal on said monitor.

6. The system as recited in claim 5, wherein said non-volatile storage device is an optical disk drive.

7. The system as recited in claim 5, wherein the data signal includes a memory address.

8. The system as recited in claim 5, wherein said central processing unit commands a storage of said text/graphic signal into a file of said non-volatile storage device.

9. A method for displaying video and corresponding text on a computer monitor from a transmitted video signal which has a data signal inserted into a vertical blanking interval of the video signal, comprising the steps off a) receiving the video and data signals;

b) separating the data signal from the video signal;

c) converting the video signal into a television signal;

d) displaying the television signal on a monitor;

e) generating a command from said separated data signal which retrieves a text/graphic signal that is resident on a non-volatile storage device; and, f) displaying the text/graphic signal on said monitor.

10. The method as recited in claim 9, further comprising the step of storing the text/graphic signal in a file.

11. A method for displaying video and corresponding text on a computer monitor, comprising the steps of:

inserting a data signal into a vertical blanking interval of a video signal;

b) transmitting the video and data signals;

c) receiving the video and data signals;

d) separating the data signal from the video signal;

d) converting the video signal into a television signal;

e) displaying the television signal on a monitor;

generating a command from said separated data signal which retrieves a text/graphic signal that is resident on a non-volatile storage device; and, g) displaying the text/graphic signal on said monitor.

12. The method as recited in claim 11, further comprising the step of storing the text/graphic signals in a file.

13. A system that receives a video signal and a data signal from a broadcaster which inserts the data signal into a vertical blanking interval of the video signal and transmits both the video and data signals, comprising:

video receiver means for receiving the video and data signals;

vertical blanking interval decoder means for separating the data signal from the video signal;

video decoder means for converting the video signal into a television signal;

monitor means for displaying said television signal;

non-volatile storage means for storing a text/graphic signal that is resident within said non-volatile storage means; and, processing means for receiving the data signal from said vertical blanking interval decoder means and generating a command to transfer said text/graphic signal from said non-volatile storage means to said monitor means to display said text/graphic signal or said monitor means.

14. The system as recited in claim 13, wherein said non-volatile storage means is an optical disk drive.

15. The system as recited in claim 13, wherein the data signal includes a memory address.

16. The system as recited in claim 13, wherein said processor means commands a storage of said text/graphic into a file of said non-volatile storage means.

17. A system, comprising:

broadcaster means for transmitting a video signal and a data signal that is inserted into a vertical blanking interval of the video signal;

video receiver means for receiving the video and data signals;

vertical blanking interval decoder means for separating the data signal from the video signal;

video decoder means for converting the video signal into a television signal;

monitor means for displaying the television signal;

non-volatile storage means for storing a text/graphic signal that is resident on said non-volatile storage means; and, processor means for receiving the data signal from said vertical blanking interval decoder means and generating a command to transfer said text/graphic signal from said non-volatile storage means to said monitor means to display said text/graphic signal on said monitor means.

18. The system as recited in claim 17, wherein said non-volatile storage means is an optical disk drive.

19. The system as recited in claim 17, wherein the data signal includes a memory address.

20. The system as recited in claim 17, wherein the processor means commands a storage of said text/graphic into a file of said non-volatile storage means.

* * * * *